United States Patent [19]

Adams

[11] 4,314,485

[45] Feb. 9, 1982

[54] SPEED CONTROL SYSTEMS

[75] Inventor: Frederick J. Adams, Clevedon, England

[73] Assignee: Cam Gears Limited, Hertfordshire, England

[21] Appl. No.: 94,225

[22] Filed: Nov. 14, 1979

[30] Foreign Application Priority Data

Nov. 16, 1978 [GB] United Kingdom ............... 44743/78

[51] Int. Cl.³ ...................... F16H 15/38; F16H 17/06
[52] U.S. Cl. ......................................... 74/200; 74/196
[58] Field of Search ................. 74/198, 199, 200, 190, 74/194, 196; 474/19, 21, 14, 15, 13, 70

[56] References Cited

U.S. PATENT DOCUMENTS

| 3,394,617 | 7/1968 | Dickenbrook | 74/200 X |
| 3,395,587 | 8/1968 | Casini | 474/15 X |
| 3,653,272 | 4/1972 | Scheiter | 74/200 X |
| 3,802,295 | 4/1974 | Lemmens | 74/194 X |
| 3,823,613 | 7/1974 | Abbott | 74/200 |
| 3,826,147 | 7/1974 | Sharpe et al. | 74/200 |
| 3,828,618 | 8/1974 | Sharpe et al. | 74/200 |
| 3,996,807 | 12/1976 | Adams | 74/200 X |

FOREIGN PATENT DOCUMENTS

| 1401428 | 7/1975 | United Kingdom | 74/194 |
| 1534016 | 11/1978 | United Kingdom | . |
| 2018894 | 10/1979 | United Kingdom | 74/200 |
| 2036893 | 7/1980 | United Kingdom | 74/200 |

Primary Examiner—C. J. Husar
Assistant Examiner—Moshe I. Cohen
Attorney, Agent, or Firm—Yount & Tarolli

[57] ABSTRACT

A speed control system includes a pair of rotatable plates having at least one power transmission roller positioned in a toroidal track formed by annular grooves in the plates. Each plate is received within a rotatable housing to which it is drivingly connected by means of a cooperating track follower and helical track so that the plate rotates with the associated housing but is free to move axially relative thereto in a screw-like motion. One housing is driven by an engine and its plate drives the other plate by means of the power transmission roller. The roller is mounted on a carrier pivotally mounted about an axis which is substantially normal to the axis of rotation of the plates and is offset from the center of the roller so that, on axial displacement of the plates, the carrier pivots so that the positions of engagement between the roller and the respective grooves change thus effecting a change in relative angular velocity of the plates. The plates are biased towards each other and into engagement with the roller by fluid under pressure in an expansible chamber associated with one of the plates and by a spring acting on the other plate. The pressure in the expansible chamber is controlled in response to the rotational speed of one of the plates.

15 Claims, 4 Drawing Figures

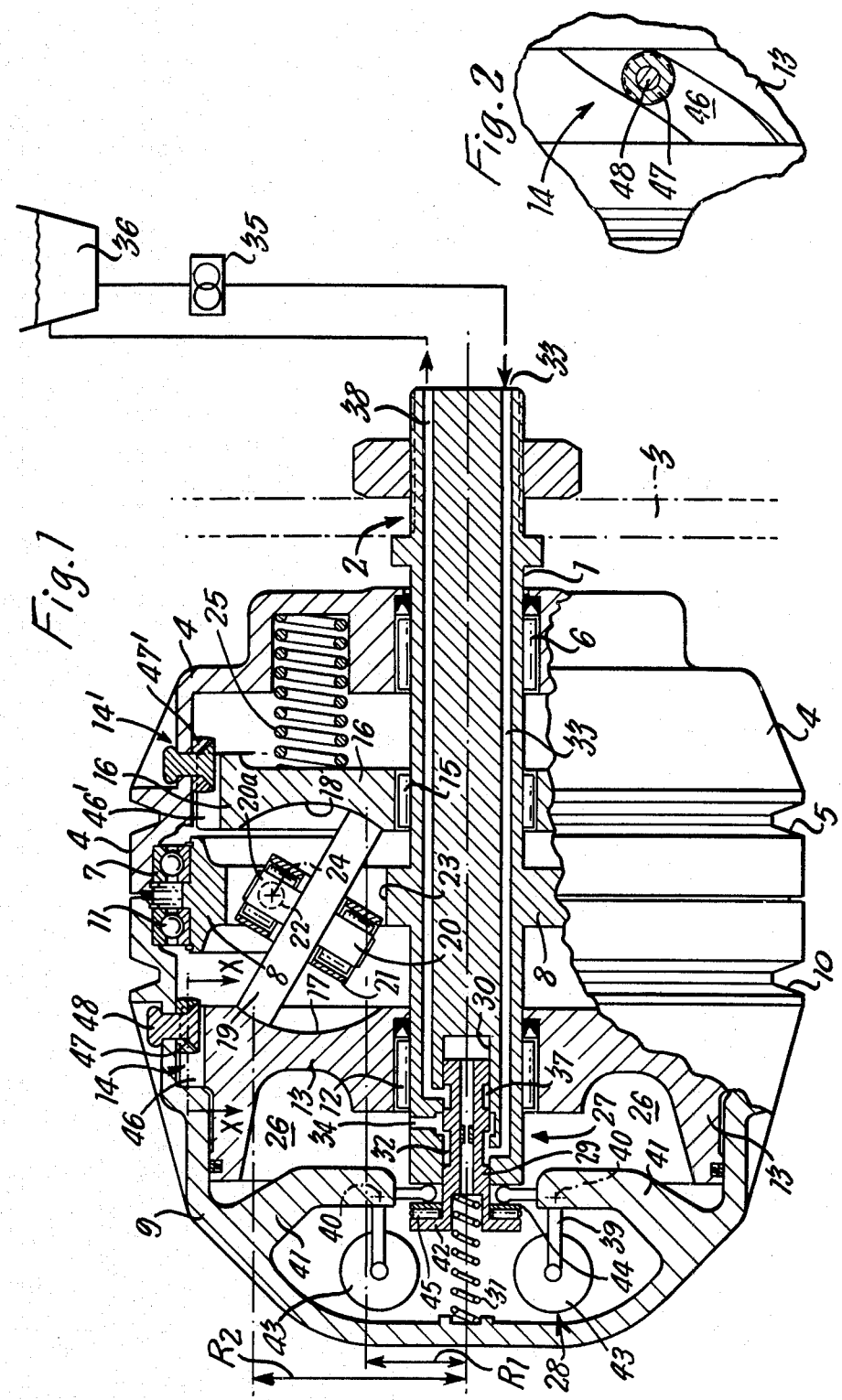

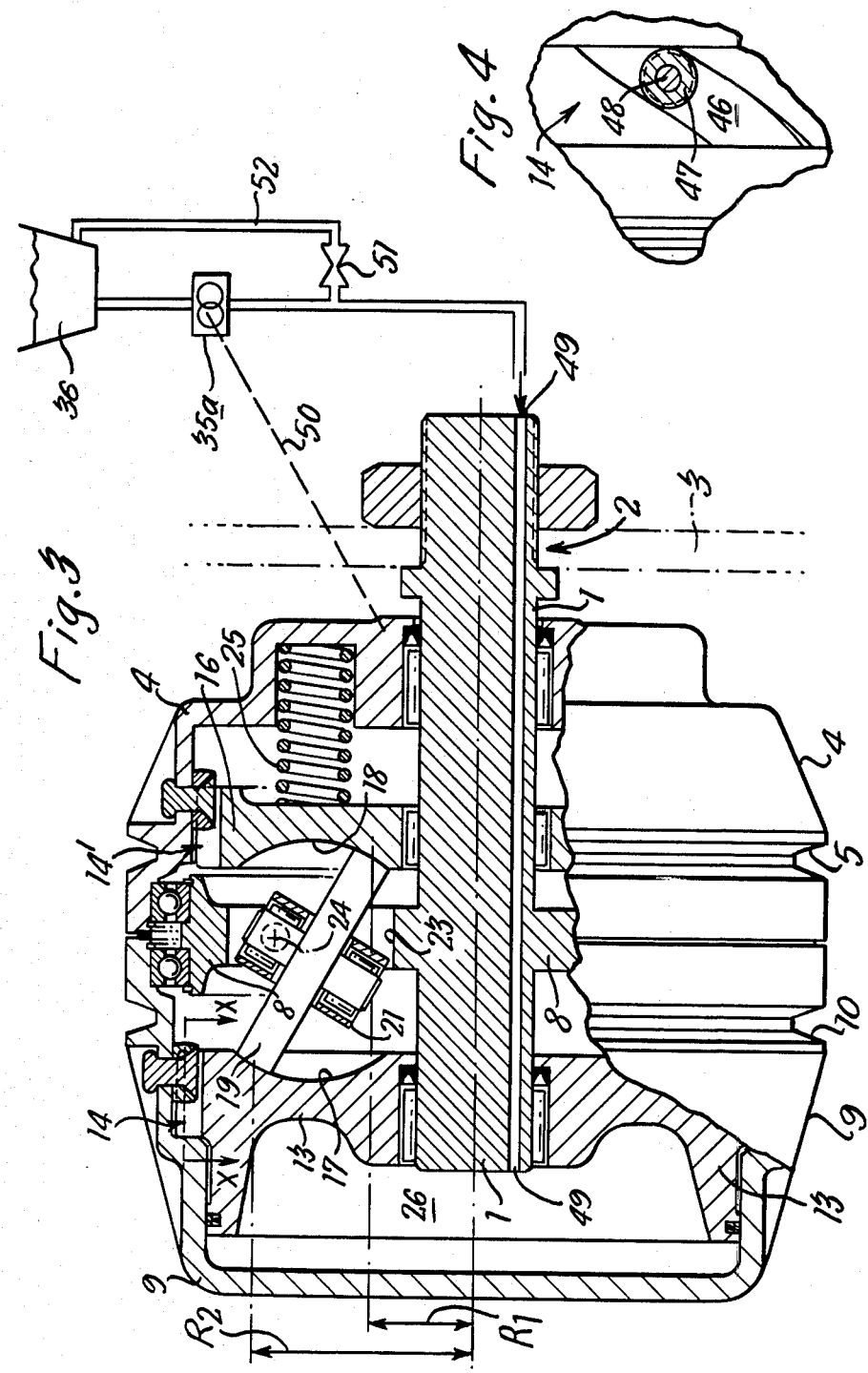

SPEED CONTROL SYSTEMS

DESCRIPTION

This invention relates to a speed control system.

More particularly, the invention concerns a speed control system of the kind which comprises coaxially mounted and opposed driven and driving plates having opposed annular grooves coaxial with the plates, the grooves forming a generally toroidal track; a power transmitting roller mounted and running within the track, said roller being rotatable about an axis which lies substantially in a plane containing the axis of rotation of the plates and engaging within each of the opposed grooves so that on rotation of the driving plate in one direction power is transmitted therefrom, through the roller, to rotate the driven plate in the opposite direction and in which said plate is axially displaceable relative to a system part which is restrained from axial displacement and biasing means is provided for urging the plates axially towards each other and into driving engagement with the power transmitting roller. A system of this kind is the subject of our U.K. Patent Specification No. 1,469,776 in which the driven and driving plates are biased axially towards each other and into driving engagement with the power transmitting roller by centrifugally operable means. It is one object of the present invention to provide an improved arrangement by which the, or one of the, plates is urged into driving engagement with the power transmission roller. It is a further object of the present invention to provide an improved arrangement for biasing the plates axially towards each other and in a manner which displaces the power transmission roller to effect a change in ratio or angular velocity at which the driving plate is driven relative to the driven plate.

Having in mind the aforementioned first object, according to the present invention there is provided a speed control system of the kind aforementioned in which said system part is coupled to said axially displaceable plate for axial rotation therewith by means of co-operating track follower means and helical track means co-axial with said plates, said track means and track follower means being arranged so that during axial displacement of said plate which is associated therewith, that plate exhibits a screwed motion relative to the system part and said motion is in a sense which causes the plate to be urged into driving engagement with the roller by torque which is imparted to that plate by its driving engagement with the roller.

Generally and preferably the system part which is coupled by the co-operating track follower means and track means to the appropriate plate will be in the form of a rotatable housing part for that plate. Alternatively however the system part can be a shaft on which the plate is mounted to exhibit rotation therewith and axial displacement with respect thereto.

The track means and track follower means may be in the form of helical splines which slidably co-operate between the system part and the appropriate plate. Preferably however and for convenience of manufacture the track means is in the form of a helical groove (which is conveniently located on the plate) while the track follower means is in the form of a roller, peg, or similar member (conveniently located on the system part) which engages within the groove.

Further according to the present invention and having in mind the aforementioned further object, there is provided a speed control system of the kind aforementioned, said two plates being biased axially towards the roller into engagement therewith and the roller being mounted on a carrier which carrier is pivotally mounted about an axis which is substantially normal to said plane containing the axis of rotation of the plates and is offset from the centre of that roller so that, on axial displacement of the plates, the carrier can pivot to displace radially relative to the axis of rotation of the plates the positions of engagement between the roller and the respective grooves to effect a change in ratio of angular velocity at which the driving plate is driven relative to the driven plate and wherein the two plates are biased towards each other and into engagement with the roller by the admission of fluid under pressure into an expansible chamber associated with one of the plates.

Either the driven or driving plate can be displaceable in response to fluid under pressure as aforementioned while the other plate is preferably spring biased to accommodate axial displacement of that plate effected by pivotal movement of the carrier and in sympathy with axial movement of the plate which is displaceable by fluid pressure. The pressure of fluid to which the expansible chamber is subjected can be variable in accordance with the delivery from a variable output pump or similar device so that the plate will be axially displaced in accordance with the increase or decrease of pressure from such device as required. Valve means can be provided to control the admission of fluid pressure to, and the exhausting of fluid pressure from, the expansible chamber, particularly when the source of fluid is at substantially constant pressure. The valve means is preferably responsive to the speed of rotation of either the driven or driving plate so that such valve means will be controlled in accordance with variations in rotational speed of that plate to cause an adjustment in fluid pressure in the expansible chamber which results in the plate associated with that chamber being axially displaced to vary the ratio at which drive is transmitted through the system as required. Automatic control for the valve means can be provided by a centrifugal governor which is responsive to the speed of rotation of one or other of the plates so that when that speed varies from a predetermined value the centrifugal governor reacts to adjust the valve means in a sense which controls fluid pressure in the expansible chamber and adjust the transmission ratio through the system to maintain the aforementioned rotational speed of the governed plate substantially constant.

Desirably the plates are accommodated in respective rotatable housing parts for rotation therewith, the housing part for the driving plate may be connected for direct drive, for example to the crankshaft of a vehicle engine, or by a V-belt or similar drive while the housing part of the driven plate may be connected as appropriate to provide an output from the system.

Embodiments of speed control systems constructed in accordance with the present invention will now be described, by way of example only, with reference to the accompanying illustrative drawings in which:

FIG. 1 is a side view partly in section of a first embodiment of the system in which a driven plate is axially displaceable by fluid pressure admitted to an expansible chamber under control of a centrifugally governed valve;

FIG. 2 is a part section of the system shown in FIG. 1 taken on the line X—X of FIG. 1 and illustrates a helical track and track follower coupling between the driven plate and a housing part for that plate;

FIG. 3 is a side view, partly in section of a second embodiment of the system in which axial displacement of the driving plate is effected by admission of fluid under pressure to an expansible chamber associated with that plate, the fluid being derived from a variable pressure source, and FIG. 4 is a part section of the system shown in FIG. 3 taken on the line X—X of that Figure and illustrates a helical track and track follower coupling between the driving plate and its housing part which is similar to the arrangement shown in FIG. 2.

Where possible throughout the following description the same parts or members as referred to in each of the Figures have been accorded the same references.

The speed control system shown in FIG. 1 has a non-rotating shaft 1 which is secured by a nut and flange arrangement 2 to some stationary point, for example a vehicle engine or a vehicle chassis 3. A housing part 4 having on its peripheral wall an integral V-pulley 5 is driven by a V-belt (not shown) for example, from the engine crank shaft and is rotatably supported by roller bearings 6 on the shaft 1 and by a ball bearing race 7 on a flange 8 which is integral with the shaft 1. A similar housing part 9 provided with an integral V-pulley 10 is also rotatably mounted on the flange 8 of the shaft 1 by a ball bearing race 11. The housings 4 and 9 are free to rotate relative to each other and are generally concentric with the shaft 1.

Rotatably mounted on the shaft 1 by roller bearings 12 is a generally annular plate 13. The plate 13 is sealed relative to the shaft and housing part 9 and is axially slidable with respect to the shaft and the housing part 9. The housing part 9 is coupled by means shown generally at 14 to the plate 13 in a manner which will be described hereinafter but such coupling 14 ensures that the housing part 9 is rotatable with the plate 13 while the latter is capable of axial displacement along the shaft 1 and relative to the housing part 9. Located within the housing part 4 and rotatably mounted by roller bearings 15 on the shaft 1 is a second plate 16 of generally annular form. The plate 16 is axially slidable along the shaft 1 and is coupled to the housing part 4 by means generally shown at 14' and which is similar to the means 14 so that the plate 16 will rotate together with the housing part 4 while being capable of axial displacement along the shaft 1 and relative to the housing part 4.

The opposing faces of the plates 13 and 16 are each provided with an annular groove 17 and 18 respectively which are of part circular section. The grooves 17 and 18 are co-axial with their respective plates and are axially opposed to form a generally toroidal track. The faces of these grooves 17 and 18, and thus the plates 13 and 16, are held apart by a circumferentially disposed array of, for example, three symmetrically arranged, power transmission rollers of which one is shown at 19. Each roller 19 rotates about an axis contained in a plane which includes the axis of rotation of the plates 13 and 16 and the rollers 19 impart by friction means a torque from the plate 16 to the plate 13 so that the latter is rotated in the opposite sense of direction to the plate 16.

Each roller 19 respectively rotates in bearings 20 and 20a which are carried by a carrier 21 which is pivotally mounted by pins indicated at 22 within an aperture 23 of the shaft flange 8. The carrier 21 together with its roller 19 is pivotable about the axis 24 of the pins 22 so that the axis of rotation of the roller 19 can swing to either side of the vertical in FIG. 1. The axis 24 extends substantially perpendicularly relative to the plane which includes the axis of rotation of the roller 19 and that of the shaft 1.

The plate 16 is biased relative to the housing part 4 (by one or more springs 25) axially relative to the shaft 1 into engagement with the roller 19. The side of the plate 13 remote from the plate 16 forms, together with the housing part 9, a chamber 26 which is intended to be subjected to fluid under pressure to bias the plate 13 axially towards the plate 16 and into engagement with the roller 19 against the biasing effect of spring 25. Hydraulic fluid pressure within the chamber 26 is controlled by valve means 27 which valve means is itself controlled by a centrifugal governor 28 responsive to the speed of rotation of the housing part 9.

The valve means 27 comprises a spool 29 which is axially slidable in a blind bore 30 formed at the end of the shaft 1 in the chamber 26. The spool 29 is biased relative to the housing part 9 by a spring 31 to a condition in which an annular recess 32 of the spool opens communication between a fluid pressure line 33 and a port 34 which latter is in constant communication with the chamber 26. The line 33 communicates with the output from a constant delivery pump 35 which is driven by the vehicle engine and draws fluid from a hydraulic reservoir 36. Axial displacement of the spool 29 against its spring biasing closes communication between its annular recess 32 and the port 34 and opens communication between the port 34 and a second annular recess 37 of the spool which latter recess communicates by way of a return line 38 with the reservoir 36. Displacement of the spool 29 against its biasing 31 is effected by the centrifugal governor 28 which comprises bell crank levers 39 which are pivotally mounted at 40 on brackets or a flange 41 extending into the chamber 26 from the housing part 9. With the centrifugal governor inoperative, one leg of each lever 39 extends radially relative to the shaft 1 to engage between the end of the shaft 1 within the chamber 26 and a flange 42 provided on the spool 29. In this latter condition the second leg of each lever 39 extends generally axially of the shaft 1 and is weighted at 43. Operation of the governor 28 is effected, as aforementioned, by rotation of the housing part 9 relative to the shaft 1 and as the speed of such rotation progressively increases the weights 43 will eventually be displaced radially outwardly of the shaft 1 by the centrifugal force to which they are subjected thereby causing the bell crank levers 39 to pivot at 40 and displace the spool 29 by reaction on its flange 42 against the biasing effect of spring 31. To alleviate friction between the non-rotating spool 29 and the rotating legs of the levers 39 which react against the flange 42, an annular bearing plate 44 is interposed between the bell crank levers and the flange 42 and the plate 44 is mounted for rotation about the axis of shaft 1 by needle roller bearings 45 which are interposed between itself and the flange 42.

We will now consider operation of the speed control system shown in FIG. 1 commencing from the condition in which the system is shown in that FIgure. Assuming that the housing part 4 is connected by a V-belt through the V-pulley 5 so that the housing part 4 is rotatably driven at variable speed (say from the crank shaft of the vehicle engine) and also that the pump 35 is operative, rotation of the housing part 4 is transmitted through the coupling 14' to rotate the plate 16 therewith which causes the plate 13 to be rotated in a contra direction as previously mentioned. With the roller 19 in the position shown whereby the radius R2 with respect to the shaft 1 at which the roller engages the groove 17 is greater than the radius R1 with respect to the shaft 1 at which the roller engages the groove 18, the speed transmission ratio between the plates 13 and 16 will be at a minimum (while the mechanical advantage for the drive which is transmitted will be at a maximum) so that the speed of rotation of the plate 13 is less than that of the plate 16—this can be advantageous particularly when starting the vehicle engine since the load presented by the speed control system to the vehicle engine is at a minimum. Upon rotation of the plate 13 the housing part 9 is rotated therewith through the coupling 14 to provide an output from the V-belt and groove 10 connection which may be used to drive, for example, auxiliary equipment of the vehicle such as a water pump or generator.

If the speed at which the housing part 9 is rotatably driven is insufficient to displace the governor 28 from its condition as shown, fluid under pressure from the pump 35 is directed by way of recess 32 and port 34 into the chamber 26 causing the latter to expand and dispslace the plate 13 rightwardly in the drawing. This has the effect of pivoting the roller 19 in an anti-clockwise direction about the pivot axis 24 of the carriage 21 and displacing the plate 16 against the biasing spring 25. During such pivotal movement of the roller 19 the radius R2 is progressively decreased while the radius R1 is increased which causes an increase in the speed of transmission ratio between the plates 16 and 13 and thereby a relative increase in the speed of rotation of the plate 13. When the speed of rotation of the plate 13 attains a predetermined value, for example that at which the aforementioned auxilliary equipment is desired to be driven at substantially constant speed, the governor 28 is arranged to react in the event that the desired constant speed is exceeded to displace the spool 29 against the biasing of spring 31 and thereby close off communication between fluid pressure from the pump 35 and the chamber 26 and if necessary to open communication between the chamber 26 and the reservoir through the return line 38. Upon opening of the chamber 26 to the reservoir the plate 13 can be displaced leftwardly in FIG. 1 under the biasing effect of spring 25 on plate 16 which reacts through roller 19 so causing the carriage 21 to pivot about its axis 24 and increase the radius R2 while the radius R1 is correspondingly decreased. In this way it will be apparent that by appropriate selection of the biasing springs 25 and 31 and characteristics of the governor 43 the control system can be arranged to provide the output which is derived from the housing part 9 with a substantially constant speed of rotation when the speed of rotation at which the housing part 4 is driven has a value which may be varied within a predetermined range of such values.

The driving connection 14 between the plate 13 and the housing part 9 comprises a helical groove 46 which is machined in the peripheral wall of the plate 13 and a button or roller 47 which engages within the groove 46 and is mounted by a stud 48 on the housing part 9. The helical groove 46 is orientated with respect to the shaft 1 so that as the plate 13 is axially displaced by fluid pressure in the chamber 26 towards the plate 16, the plate 13 exhibits a screwed motion or partial rotation about the shaft 1. This latter screwed motion effected by relative movement of the groove 46 over the button 47 is in the same rotational direction as that in which the plate 13 is driven by the roller 19 so that the torque effected on the plate 13 by its frictional engagement with the roller 19 imparts relative rotational movement between the housing part 9 and the plate 13 to urge the plate 13 axially into closer engagement with the roller 19. The coupling 14' between the plate 16 and housing part 4 serves a similar purpose to the coupling 14 but in the case of coupling 14' it is ensured that the orientation of its helical track 46' which engages with the follower 47' on the housing part 4 will impart screwed axial movement to the plate 16 in a sense which ensures that the plate 16 is urged axially relative to the housing part 4 into contact with the roller 19 as a result of the torque to which the plate 16 is subjected between the housing part 4 and the roller 19.

The speed control system in the embodiment of FIGS. 3 and 4 is simlar to the embodiment previously described but differs in a main respect in that the centrifugal governor and spool valve have been omitted and the expansible chamber 26 is in constant communication by way of line 49 through the shaft 1 with the output of a variable delivery pump 35a which draws hydraulic fluid from the reservoir 36. Furthermore, the housing part 9 is intended to be driven by a variable speed rotary input, conveniently by belt drive on the V-groove 10 from a vehicle crank shaft, while the casing part 4 is intended to provide a rotational output to drive, preferably at substantially constant speed, for example auxilliary equipment of the vehicle by way of a belt drive engaging with the V-groove 5.

The output of pump 35a being variable increases with the speed of the pump and it is this output which is used to expand the chamber 26 or to permit the chamber 26 to contract thereby displacing the plate 13 against the biasing spring 25 or permitting the plate 13 to be displaced under the effect of the biasing spring 25 respectively. Preferably the pump 35a is arranged to be driven at a speed which is proportional to the rotary speed of the output housing part 4 and indeed the pump 35a is conveniently driven through an appropriate linkage indicated at 50 from the casing part 4. In addition to communicating with the chamber 26, the output from the pump 35 communicates by way of a temperature compensated restrictor 51 and a line 52 with the reservoir 36.

With the system shown in FIGS. 3 and 4 inoperative there is no output from the pump 35a and consequently the chamber 26 is in a contracted condition by the plate 13 being biased to the end position shown in FIG. 3 by the spring 25 through the roller 19 and plate 16. Upon initial rotation of the housing part 9, the plate 13 is rotated through the coupling 14 while the plate 16 which is driven through its frictional engagement with the roller 19 has a rotational speed greater than that of the plate 13 (since in the initial condition R2 is greater than R1). Consequently, the housing part 4 is driven through the coupling 14' at a greater rotational speed than the housing part 9 and drives the pump 35a accordingly. As the rotational input speed to the plate 13 increases so will the delivery from the pump 35a until, at a predetermined rotational speed of the housing part 4, fluid pressure in the chamber 26 attains a value whereby the biasing effect therefrom on the plate 13 causes the plate 13 to be displaced towards the plate 16 against the biasing of spring 25. This latter effect results in the roller 19 pivoting with its carriage 21 about axis 24 so reducing the radius R2 and correspondingly increasing the radius R1. As the radius R2 decreases and the radius R1 increases in proportion therewith there is a reduction in the ratio at which rotary speed is transmitted from the plate 13 through the roller 19 to the plate 16 and thereby to the housing part 4 which causes a reduction in the output from the pump 35a. In this way, by appropriate selection of the spring 25 and the effective pressurised area of the plate 13 in chamber 26 it can be ensured that the plate 13 will be displaced axially relative to the shaft 1 to pivot the roller 19 in a manner which will maintain the rotational speed of the housing part 4 substantially constant when the housing part 9 is rotatably driven at a speed which can be varied within a predetermined range of rotatable speeds.

It will be seen from FIG. 4 that the helical groove and button follower coupling 14 for the embodiment of FIG. 3 is constructed in the same manner and serves the same purpose as in the earlier described embodiment; this is also true of the coupling 14' in FIG. 3.

I claim:

1. A speed control system comprising co-axially mounted driven and driving plates having opposed annular grooves co-axial with the plates, said opposed grooves forming a generally toroidal track, a power transmitting roller mounted and running within the track, said roller being rotatable about an axis which lies substantially in a plane containing the axis of rotation of said driven and driving plates and engaging within each of the opposed grooves so that on rotation of said driving plate in one direction power is transmitted therefrom through the roller to rotate said driven plate in the opposite direction, a system part which is restrained from axial displacement, said driven and driving plates being axially displaceable relative to said system part, a carrier supporting said roller, said carrier being pivotally mounted about an axis which is substantially normal to said plane containing the axis of rotation of said driven and driving plates and offset from the center of said roller so that on axial displacement of said driven and driving plates said carrier can pivot to displace radially relative to the axis of rotation of said driven and driving plates the positions of engagement between the roller and the respective grooves to effect a change in ratio of angular velocity at which said driving plate is driven relative to said driven plate, means biasing said driven and driving plates toward each other and into engagement with said roller, one of said driven and driving plates being biased towards the other plate and into engagement with said roller by fluid under pressure in an expansible chamber associated with said one of said driving and driven plates, valve means for controlling the admission of fluid to and the exhausting of fluid from said expansible chamber, said valve means being responsive to the speed of rotation of either said driven or driving plate so that said valve means is controlled in accordance with variations in rotational speed of either said driven or driving plate to which it is responsive to cause an adjustment in fluid pressure in the expansible chamber and thereby displacement of said one of said driven and driving plates and a variation in the ratio at which drive is transmitted through the system between said driven and driving plates.

2. A speed control system as defined in claim 1 further including a centrifugal governor responsive to the speed of rotation of said driven or driving plate for controlling said valve means.

3. A speed control system as defined in claim 1 wherein said valve means is responsive to the speed of rotation of said driven plate and means for adjusting said valve means in response to a variation in the speed of rotation of said driven plate to tend to maintain the speed of said driven plate substantially constant.

4. A speed control system comprising co-axially mounted driven and driving plates having opposed annular grooves co-axial with the plates, said opposed grooves forming a generally toroidal track, a power transmitting roller mounted and running within the track, said roller being rotatable about an axis which lies substantially in a plane containing the axis of rotation of said driving and driven plates and engaging within each of the opposed grooves so that on rotation of said driving plate in one direction power is transmitted therefrom through the roller to rotate said driven plate in the opposite direction, a system part which is restrained from axial movement, said driving and driven plates being axially displaceable relative to said system part, a carrier supporting said roller, said carrier being pivotally mounted about an axis which is substantially normal to said plane containing the axis of rotation of said driving and driven plates and offset from the center of said roller so that on axial displacement of said driving and driven plates said carrier can pivot to displace radially relative to the axis of rotation of said driving and driven plates the positions of engagement between said roller and the respective grooves to effect a change in ratio of angular velocity at which said driving plate is driven relative to said driven plate, means biasing said driving and driven plates toward each other and into engagement with said roller, one of said driving and driven plates being biased towards the other plate and into engagement with said roller by fluid under pressure in an expansible chamber associated with said one of said driving and driven plates, a source of fluid pressure in constant communication with said expansible chamber and which provides a variable pressure output, a passage having a restrictor therein constantly communicating said pressure output with exhaust, and said source of fluid pressure providing an output the pressure of which increases and decreases in proportion to an increase or decrease respectively in the rotational speed of either of said driving and driven plates.

5. A speed control system as defined in claim 4 wherein said fluid source comprises a variable speed pump drivingly connected to said driven plate so that the output of said pump is proportional to the speed of rotation of said driven plate.

6. A speed control system comprising co-axially mounted and opposed driven and driving plates having opposed annular grooves coaxial with said plates, said opposed grooves forming a generally toroidal track, a power transmitting roller mounted and running within said track, said roller being rotatable sbout an axis which lies substantially in a plane containing the axis of rotation of said driving and driven plates and engaging within each of said opposed grooves so that on rotation of said driving plate in one direction power is transmitted therefrom through said roller to rotate said driven plate in the opposite direction, a system part restrained from axial displacement, biasing means for biasing said driving and driven plates axially towards each other and into driving engagement with said roller, at least one of said driving and driven plates being axially displaceable relative to said system part, first means for connecting said axially displaceable plate to said system part for joint rotation therewith, said first means for connecting said axially displaceable plate to said system part comprising means for rotating said axially displaceable plate relative to said system part in a direction to cause said axially displaceable plate to be urged into driving engagement with said roller by torque which is imparted to said axially displaceable plate by its driving engagement with said roller as said one axially displaceable plate moves axially, said last recited means including a helical track coaxial with said axially displaceable plate and a cooperating track follower, said helical track being located on one of said system part or said one axially displaceable plate and said cooperating track follower being located on the other of said system part or said one axially displaceable plate.

7. A system as claimed in claim 6 wherein said system part comprises a rotatable housing part for said one axially displaceable plate.

8. A system as claimed in claim 6 wherein said housing part is drivingly connected with said one displaceable plate so that said one displaceable plate and housing part rotate together.

9. A system as claimed in claim 6 in which said track follower means and helical track means comprise helical splines slidably cooperating between said one axially displaceable plate and said system part.

10. A system as claimed in claim 6 wherein said helical track means comprises a helical groove and said track follower means comprises a roller member which rollers in said helical groove.

11. A system as claimed in claim 10 wherein said helical groove is located on said one axially displaceable plate and said roller member is carried by said system part.

12. A system as claimed in claim 11 wherein said helical groove is formed in a cylindrical peripheral portion of said one axially displaceable plate.

13. A system as claimed in claim 6 wherein the other of said driving and driven plates is axially displaceable, and further including another system part which is restrained from axial movement, and second means for connecting the other axially displaceable plate to said another system part, said second means comprising means for rotating said other axially displaceable plate relative to said another system part in a direction to cause said other axially displaceable plate to be urged into driving engagement with said roller as said other plate moves axially, said last recited means including a helical track coaxial with said other axially displaceable plate and a cooperating track follower, said helical track being located on one of said another system part or said other axially displaceable plate and said cooperating track follower being located on the other of said another system part or said other axially displaceable plate.

14. A system as claimed in claim 13 wherein said another system part comprises a rotatable housing part for said other axially displaceable plate.

15. A system as claimed in claim 13 wherein said biasing means comprises an expansible chamber associated with one of said axially displaceable plates into which fluid under pressure is admitted to provide for the axial displacement of said one axially displaceable plate.

* * * * *

UNITED STATES PATENT AND TRADEMARK OFFICE
CERTIFICATE OF CORRECTION

PATENT NO. : 4,314,485

DATED : February 9, 1982

INVENTOR(S) : Frederick J. Adams

It is certified that error appears in the above-identified patent and that said Letters Patent are hereby corrected as shown below:

Column 9, line 27, change "rollers" to --rolls--.

Signed and Sealed this

Thirty-first Day of August 1982

[SEAL]

Attest:

GERALD J. MOSSINGHOFF

Attesting Officer     Commissioner of Patents and Trademarks